United States Patent [19]

Iizuka

[11] Patent Number: 5,579,226
[45] Date of Patent: Nov. 26, 1996

[54] GEAR CHANGE CONTROLLER FOR AUTOMATIC TRANSMISSION

[75] Inventor: Naonori Iizuka, Fuji, Japan

[73] Assignee: Jatco Corporation, Japan

[21] Appl. No.: 305,669

[22] Filed: Sep. 14, 1994

[30] Foreign Application Priority Data

Sep. 29, 1993 [JP] Japan .................. 5-243121

[51] Int. Cl.⁶ .................................. B60K 41/06
[52] U.S. Cl. ........................... 364/424.1; 477/34
[58] Field of Search .................. 364/424.1; 477/34, 477/115, 129

[56] References Cited

U.S. PATENT DOCUMENTS

| | | | |
|---|---|---|---|
| 4,269,281 | 5/1981 | Schneider et al. | 180/70 |
| 4,353,272 | 10/1982 | Schneider et al. | 74/859 |
| 5,231,897 | 8/1993 | Morita | 364/424.1 X |
| 5,235,875 | 8/1993 | Yoshida et al. | 477/129 |
| 5,245,541 | 9/1993 | Tomomatsu | 364/424.1 |
| 5,345,843 | 9/1994 | Fujita et al. | 364/424.1 X |

FOREIGN PATENT DOCUMENTS 3-22328  2/1986  Japan .

OTHER PUBLICATIONS

Taschenbuch der Mathematik, by I. N. Bronstein & K. A. Semendjajew, Verlag Harri Deutsch, Zurich und Frankfurt/Main, 1974 (No translation).

*Primary Examiner*—Collin W. Park
*Attorney, Agent, or Firm*—Rossi & Associates

[57] ABSTRACT

A gear control means determines the gear position of an automatic transmission based on a vehicle speed V and throttle opening T input from a vehicle speed sensor and throttle opening sensor, and on a predetermined gear change-over lines which take form of kinked lines expressing "vehicle speed/throttle opening" characteristics for up-shifting and down-shifting respectively. The gear control means is provided with a memory unit and a gear determining unit. To increase the freedom in setting the gear change-over lines, the memory unit first stores the coordinates ($x_{1i}$, $y_{1i}$) and ($x_{2i}$, $y_{2i}$) of the two ends of each of the linear portions forming the kinked lines, and the gear determining unit selects the linear portion for which the expression $x_{2i} > V$ is satisfied and having the minimum value of $x_{2i}$, and determines that a shift to higher gear position should be made if the condition $(T-y_{1i})(x_{2i}-x_{1i}) < (V-x_{1i})(y_{2i}-y_{1i})$ occurs with respect to a kinked line for up-shifting, or that a shift to lower gear position should be made if the condition $(T-y_{1i})(x_{2i}-x_{1i}) > (V-x_{1i})(y_{2i}-y_{1i})$ occurs with respect to a kinked line for down-shifting.

2 Claims, 5 Drawing Sheets

GEAR CHANGE CONTROLLER FOR AUTOMATIC TRANSMISSION

BACKGROUND OF THE INVENTION

1. Field of the Invention

The present invention relates to a gear change controller for an automatic transmission.

2. Description of the Prior Art

A gear change controller for an automatic transmission is described for example in Japanese Patent Publication No.3-22328.

A conventional gear change controller for an automatic transmission performs gear change by comparing a vehicle speed V and throttle opening T input to a computer by a vehicle speed sensor and throttle opening sensor, with a kinked line (gear change-over line) expressing "vehicle speed/throttle opening" characteristics. Such kinked lines are prepared for up-shifting and down-shifting respectively as shown in FIG. 5. Numbers in FIG. 5 correspond to each gear positions. Thus, for instance, the kinked line A is used when up-shifting from the second gear position to the third gear position is determined, and the kinked line B is used when down-shifting from the third gear position to the second gear position is determined.

More specifically, when changing gear position, an interpolation value Vp' is determined on the kinked line expressing "vehicle speed/throttle opening" characteristics based on the present throttle opening Tp, the interpolation value Vp' is then compared with the present vehicle speed V, and the required gear change is then determined from their relative magnitudes.

The interpolation value Vp' is calculated by reading a slope ai of the linear portion to which the throttle opening Tp corresponds and coordinates (Ti, Vi) of the lower end of this linear portion, and performing the following computation.

$$Vp'=ai(Tp-Ti)+Vi \qquad 1)$$

where ai is the slope of the corresponding linear portion.

If the interpolation value Vp' is larger than present vehicle speed Vp, the gear selection actuator is controlled so as to perform a gear change-over.

Hence, in above-described gear change controller, when determining a required gear change, there is no need to perform a division calculation in order to obtain the interpolation value.

The calculation is therefore processed in a short time and with a small number of steps.

In the above-described prior art, the kinked line (gear change-over line) expressing "vehicle speed/throttle opening" characteristics was stored in terms of the slope ai of the elemental linear portions of the line and the coordinates (Ti, Vi) of the lower ends of these portions.

Since data is expressed as integers in a memory of the computer, the slopes of these linear portions therefore also had to be expressed as integers. However, not many slopes can be expressed as integers, so that there was not much freedom in setting the gear change-over line.

SUMMARY OF THE INVENTION

It is therefore the general object of this invention to provide a gear change controller for an automatic transmission which controls gear change according to the running state of a vehicle, this controller being capable of setting a gear change-over line having ideal characteristics.

It is another object of this invention to provide a gear change controller which in particular can set a kinked gear change-over line comprising a plurality of linear portions, this kinked line expressing ideal gear change characteristics.

It is further object of this invention to provide a gear change controller which can set the linear portions of the kinked gear change-over line so that they have any desired slope.

Another object is to provide a gear change controller which can store data for the kinked gear change-over line comprising a plurality of linear portions in a memory of small storage capacity.

Still further object of the invention is to provide a gear change controller for an automatic transmission which can perform gear control in a short time period.

Another object is to provide a gear change controller for an automatic transmission which changes gear position by finding an interpolation value without performing a division calculation based on the detection values of throttle opening, vehicle speed and a stored kinked line expressing "vehicle speed/throttle opening" characteristics, and to provide a greater degree of freedom in setting the gear change-over line.

According to the first aspect of the present invention, as shown in FIG. 1, a gear change controller for an automatic transmission comprises; at least a vehicle speed sensor (a) and a throttle opening sensor (b), gear control means (d) which determines a gear position that should be selected by an automatic transmission (c) based on the input from the vehicle speed sensor (a) and the throttle opening sensor (b) and based on kinked lines expressing "vehicle speed x/throttle opening y" characteristics, and outputs a change-over signal according to this determination result, and a gear change-over actuator (e) driven by the change-over signal from the gear control means (d), this gear control means (d) having a memory unit (f) which stores the graphical coordinates (x1i, y1i), (x2i, y2i) [i=1,2,3 ... ] of the two ends of each of the linear portion of the kinked lines expressing said "vehicle speed x/throttle opening y" characteristics, and a gear change determining unit (g) which, based on a vehicle speed V detected by said vehicle speed sensor or based on a throttle opening T detected by said throttle opening sensor, first selects the linear portion for which the following expression is satisfied and having the minimum value of x2i or y2i;

$$x2i>V, \text{ or } y2i>T$$

and the gear change determining unit (g) then determining that a shift to higher gear position should be made if the following condition occurs with respect to a kinked line for up-shifting;

$$(T-y1i)(x2i-x1i)<(V-x1i)(y2i-y1i)$$

or that a shift to lower gear position should be made if the following condition occurs with respect to a kinked line for down-shifting.

$$(T-y1i)(x2i-x1i)>(V-x1i)(y2i-y1i)$$

Further, as the second aspect of the present invention, it may also be arranged that when the gear change determining unit (g) has selected a linear portion for which the equation y2i=y1i is satisfied on the kinked lines expressing "vehicle speed x/throttle opening y" characteristics, the gear change determining unit determines that a shift to higher gear position should be made when the condition T<y1i occurs with respect to the kinked line for up-shifting, or that a shift to lower gear position should be made when the condition T>y2i occurs with respect to the kinked line for down-shifting.

In operation, the gear change determining unit (g) inputs a vehicle speed V and throttle opening T from a vehicle speed sensor (a) and throttle opening sensor (b), and based on these values, first selects the linear portion for which the expression x2i>V or y2i>T is satisfied and having the minimum value of x2i or y2i, from among linear portions whereof the coordinates (x1i, y1i), (x2i, y2i) of the two ends of each portion are stored and which together form kinked lines, and then determines that a shift to higher gear position should be made if the following condition occurs with respect to a kinked line for up-shifting;

$$(T-y1i)(x2i-x1i) < (V-x1i)(y2i-y1i)$$

or that a shift to lower gear position should be made if the following condition occurs with respect to a kinked line for down-shifting.

$$(T-y1i)(x2i-x1i) > (V-x1i)(y2i-y1i)$$

Based on this determining result, the gear change determining unit then drives a gear change actuator (e) so as to perform a gear change-over.

According to the second aspect of the invention, when the line satisfying the equation y2i=y1i has been selected, it is determined that a shift to higher gear position is necessary if the condition T<y1i occurs and that a shift to lower gear position is necessary if the condition T>y2i occurs. The determining process therefore does not require any computation to find products or differences.

BRIEF DESCRIPTION OF THE DRAWINGS

Other objects and advantages of the present invention will be understood from the following description of preferred embodiments, which are shown in accompanying drawings in which.

DESCRIPTION OF THE PREFERRED EMBODIMENT OF THE INVENTION

This invention will now be described in further detail with reference to the drawings.

Figure 1:
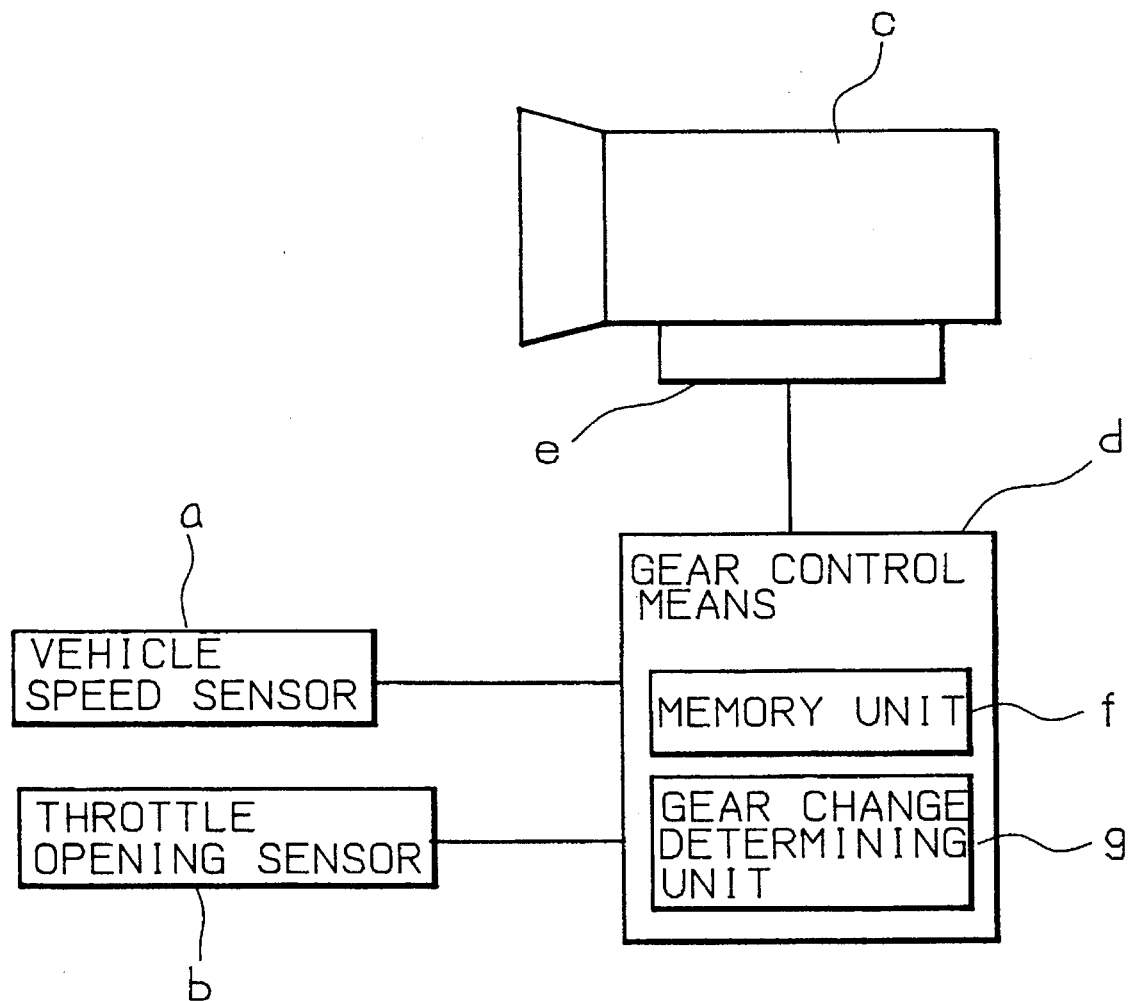
FIG. 1 illustrates an automatic transmission system incorporating a gear change controller of this invention.
Figure 2:
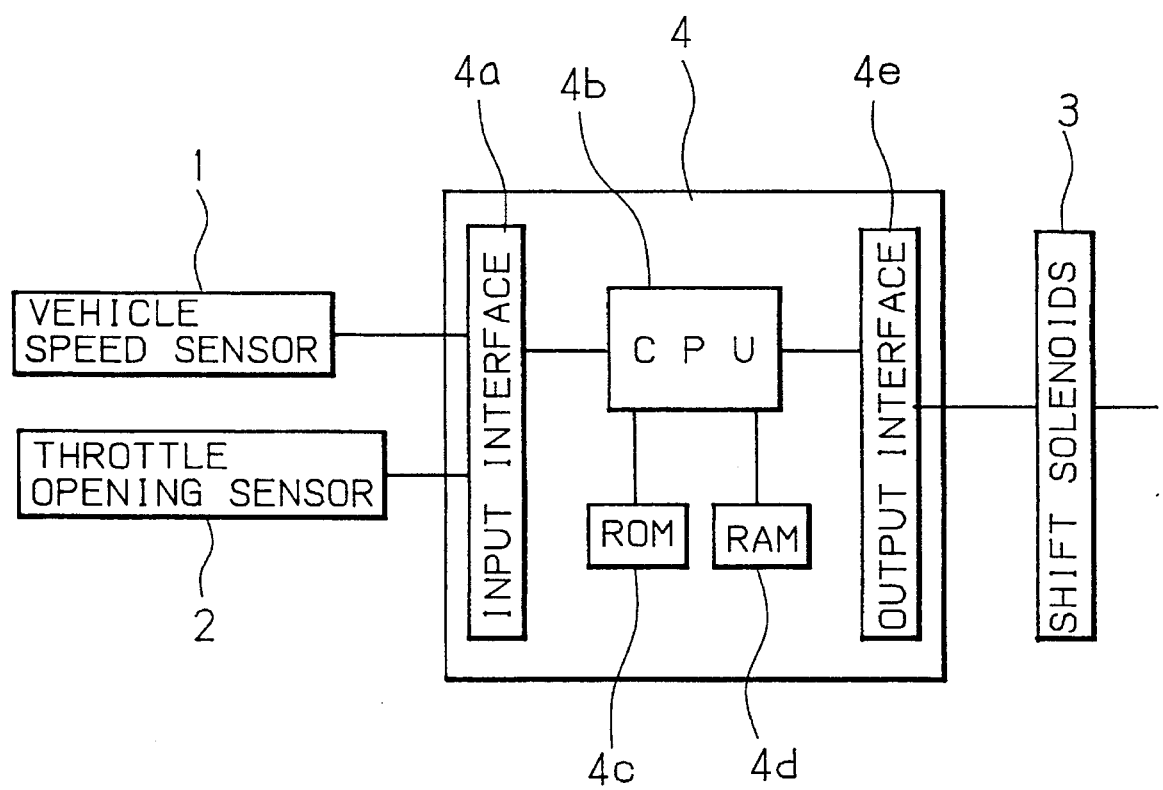
FIG. 2 is a block diagram showing the gear change controller for an automatic transmission according to one embodiment of this invention.

Referring to FIG. 2, there is illustrated the gear change controller of this invention including a control unit 4, in conjunction with a vehicle speed sensor 1 and a throttle opening sensor 2 as input means, and a set of shift solenoids 3 as gear change-over actuator. A control unit 4 which acts as a gear control means comprises an input interface 4a, CPU 4b, ROM (memory) 4c, RAM 4d, and output interface 4e.

Figure 3:
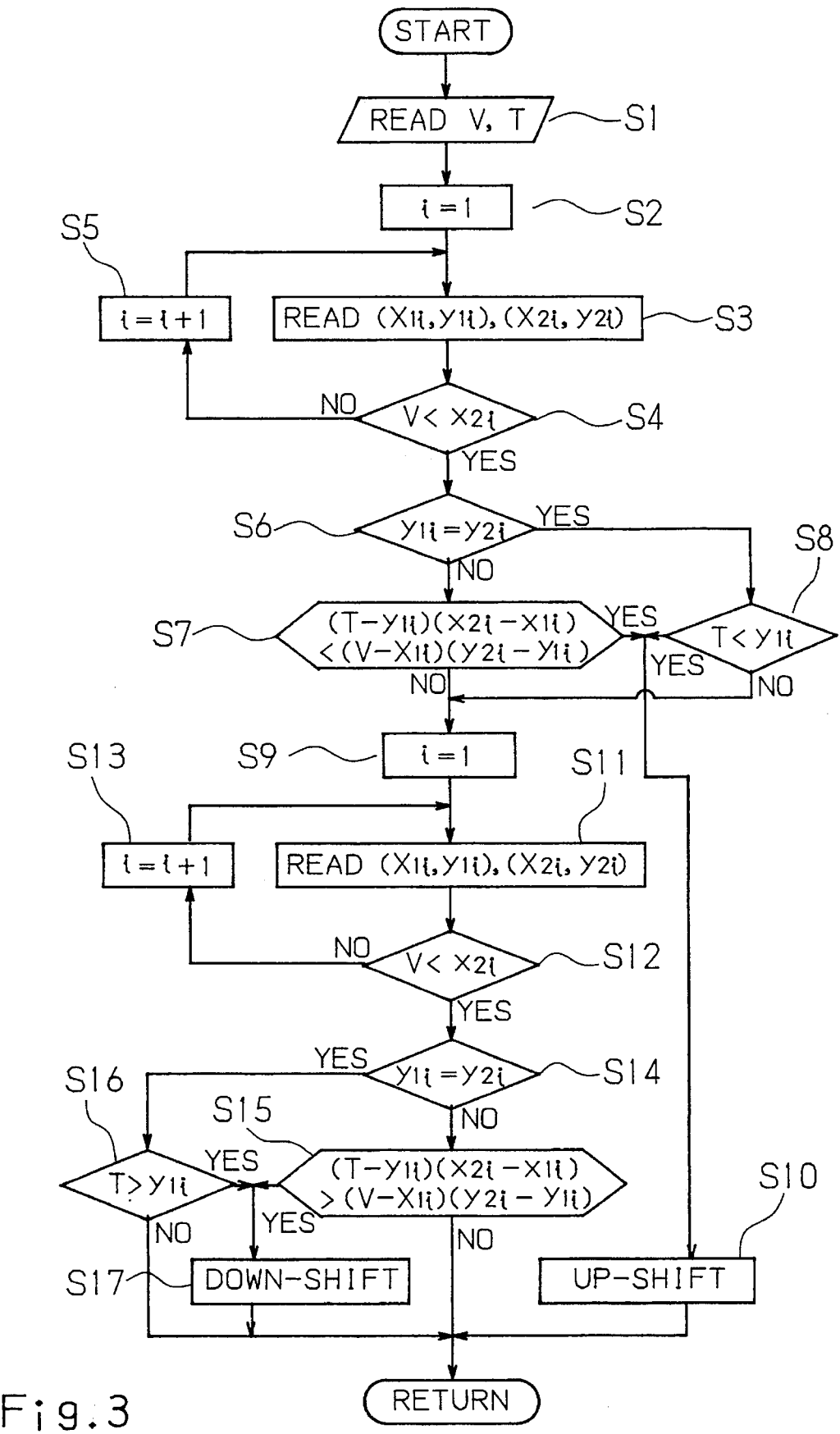
FIG. 3 is a flow chart showing the flow of control operations performed by the device according to the embodiment.

Next, of the processes executed by the CPU 4b, the process for determining a shift to higher gear position or lower gear position will be described in particular detail with reference to FIG. 3.

At step S1, the vehicle speed V and throttle opening T are read from the vehicle speed sensor 1 and the throttle opening sensor 2.

At step S2, i is set to 1.

Figure 4:
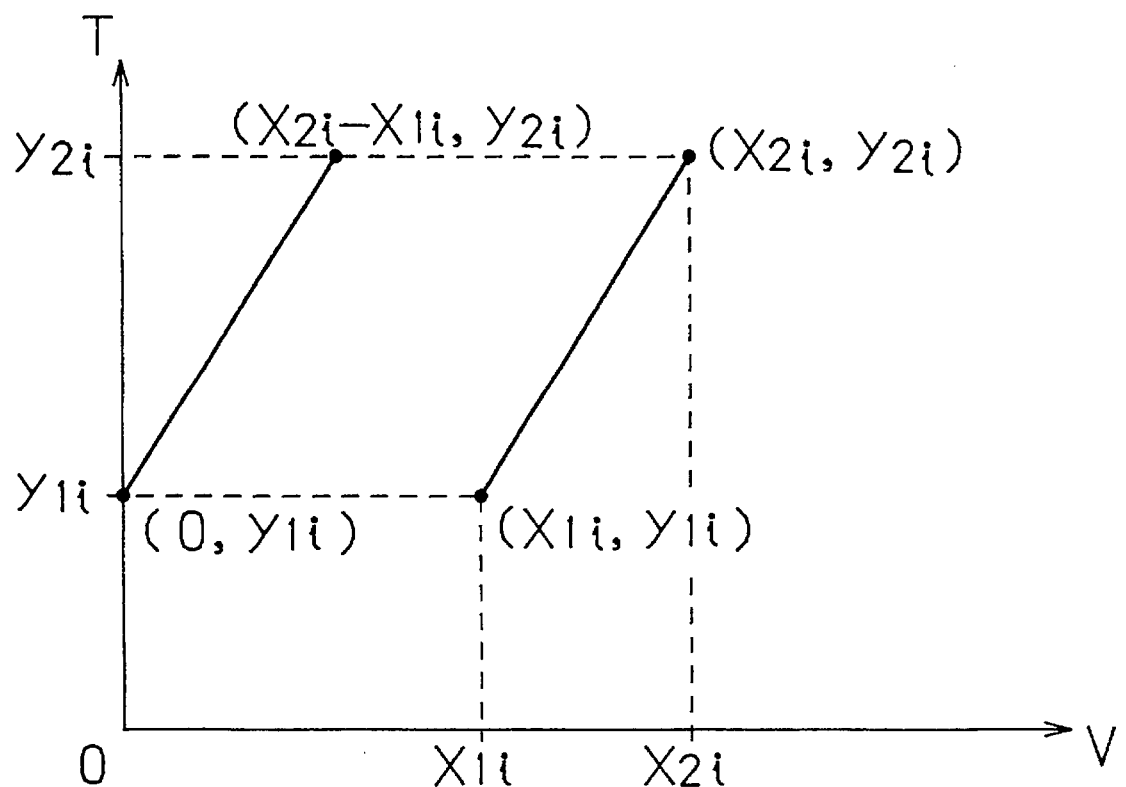
FIG. 4 is a characteristic diagram showing one of the linear portions forming the kinked line (gear change-over line) of the device according to the embodiment.
Figure 5:
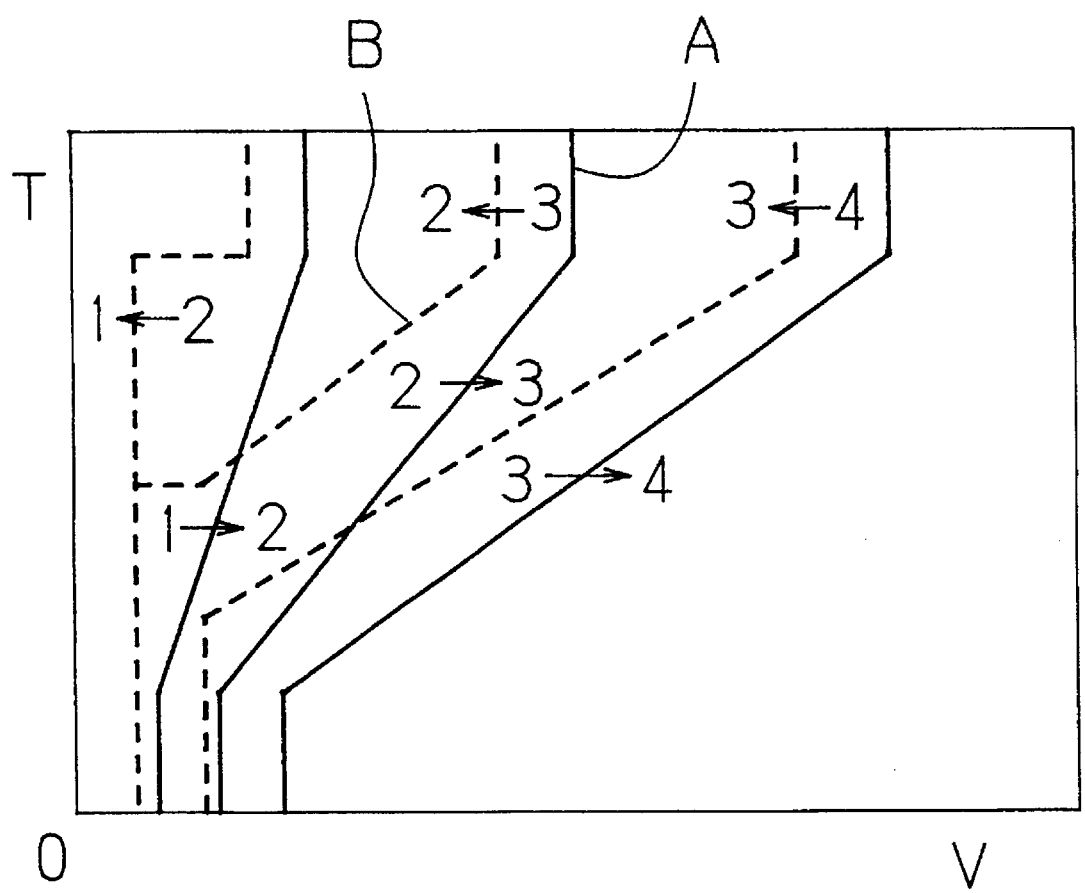
FIG. 5 is a diagram showing kinked lines.

At step S3, the coordinates (x1i, y1i) and (x2i, y2i) of the two ends of each of the linear portions forming a kinked line expressing "vehicle speed/throttle opening" characteristics for up-shifting are read from the ROM 4c. At this step, the coordinates corresponding to the value of i (=1) which were set at the preceding step S2 are read first, and then the coordinates corresponding to the value of i set at step S5 to be described hereinafter are to be read. In one example of linear portions forming a kinked line, the coordinates (x1i, y1i) have lower values and the coordinates (x2i, y2i) have higher values as shown in FIG. 4.

At step S4, the vehicle speed V which was read at step S1 is compared with the value x2i of the coordinates of the linear portion having a higher value. If the expression V<x2 is true (YES), the routine proceeds to step S6, otherwise if this expression is not true (NO), the routine proceeds to the step S5. In other words, at this step S4, linear portions corresponding to the present vehicle speed V are determined, and the linear portion having the minimum values of (x2i, y2i) is selected.

If the routine proceeds to the step S5, the value of i is incremented by 1 (i=i+1), the routine then returns to the step S3, and the aforesaid determining process is repeated.

At the step S6, it is determined whether or not the condition y1i=y2i is satisfied. If the answer to this question is YES, the routine proceeds to step S8, otherwise if the answer to this question is NO, the routine proceeds to step S7. Further, if the condition y1i=y2i is satisfied, the linear portion will be horizontal in FIG. 4.

At the step S7, it is determined whether or not the following expression 2) holds. If it does hold, the routine proceeds to step S10, and if it does not hold, the routine proceeds to step S9. In other words, at this step S7, it is determined whether or not the present vehicle speed V and throttle opening T are in a higher vehicle speed region than the kinked line. This will be described in further detail hereinafter:

$$(T-y1i)(x2i-x1i) < (V-x1i)(y2i-y1i) \qquad 2)$$

At the step S8, it is determined whether or not the expression T<y1i holds. If this expression is true (YES), the routine proceeds to the step S10, and if it is not true (NO), the routine proceeds to the step S9. At the step S10, it is determined that a shift to higher gear position should be made.

On the other hand, the steps following the step S9 relate to determining and processing for shifting to lower gear position.

At the step S9, the value of i is reset to 1.

At step S11, the coordinates (x1i, y1i), (x2i, y2i) of the two ends of each of the linear portions forming a kinked line expressing "vehicle speed/throttle opening" characteristics for shifting to lower gear position are read from the ROM 4c. At this step, the coordinates corresponding to the value of i (=1) which was set at the preceding step S9 are read first, and then the coordinates corresponding to the value of i set at step S13 to be described hereinafter are to be read.

At step S12, the present vehicle speed V is compared with the value x2i of the coordinates of the linear portion having a higher value. If the expression V<x2i is true (YES), the routine proceeds to step S14, otherwise if this expression is not true (NO), the routine proceeds to the step S13. In other words, at this step S12, linear portions corresponding to the present vehicle speed V are determined, and the linear portion having the minimum values of (x2i, y2i) is selected.

If the routine proceeds to the step S13, the value of i is incremented by 1 (i=i+1), the routine then returns to the step S11, and the aforesaid determining process is repeated.

At the step S14, it is determined whether or not the expression y1i=y2i is true. If the answer to this question is YES, the routine proceeds to step S16, otherwise if the answer to this question is NO, the routine proceeds to step S15.

The step S14 is the same as the preceding step S6.

At the step S15, it is determined whether or not the following expression 3) holds. If it does hold, the routine proceeds to step S17, and if it does not hold, the routine returns to the step S1. In other words, at the step S15, it is determined whether or not the present vehicle speed V and throttle opening T are in a lower vehicle speed region than the kinked line. This will be described in further detail hereinafter.

$$(T-y1i)(x2i-x1i)>(V-x1i)(y2i-y1i) \quad 3)$$

At the step S17, it is determined that a shift to lower gear position should be made.

Of the CPU 4b, the part which performs the process of FIG. 3 described hereinabove corresponds to the gear change determining unit described in the appended claims.

The aforesaid determining conditions 2), 3) will now be described in further detail.

The linear portion shown in FIG. 4 may be expressed by the following equation 4):

$$T=a(V-x1i)+y1i \quad 4)$$

where $a=(y2i-y1i)/(x2i-x1i)$.

The following equation 5) therefore holds:

$$T=[(y2-y1i)/(x2i-x1i)](V-x1i)+y1i \quad 5)$$

As shifts to higher gear position are determined when the vehicle running condition is on the lower throttle opening side (higher vehicle speed side) of the gear change-over line, it is determined that a shift to higher gear position should be made when the following condition holds.

$$T<[(y2-y1i)/(x2i-x1i)](V-x1)+y1i \quad 6)$$

This expression 6) is equivalent to the above expression 2).

In the case of a shift to lower gear position, the direction of the inequality in the above expression 2) is reversed.

As hereintofore described, according to this embodiment, the coordinates (x1i, y1i) and (x2i, y2i) of the two ends of each of the linear portions of the kinked line expressing "vehicle speed/throttle opening" characteristics are stored in the ROM 4c, and the determining of a shift to a higher or lower gear position is performed by means of the inequalities in the expressions 2) or 3). Since this computation involves two products and two differences, and as no division is involved, processing time is short as in the prior art. Further, according to this embodiment, what is stored in the ROM is not the slope of the linear portions of the kinked line, but the coordinates. There is therefore no need for the slope to be an integer, and the degree of freedom in setting the gear changeover line is consequently much higher.

Moreover, when the line satisfying the equation y2i=y1i has been selected, it is determined that a shift to higher gear position is necessary if the condition T<y1i occurs and that a shift to lower gear position is necessary if the condition T>y2i occurs. The determining process therefore does not require any computation to find products or differences, and the time required for the determination can be shortened further.

The foregoing description of a preferred embodiment for the purposes of illustrating the invention is not to be considered as limiting or restricting the invention, and many modifications may be made by the exercise of skill in the art without departing from the scope of the invention.

For example, according to this embodiment, the linear portion for which the condition x2i>V is satisfied and having the minimum value of x2i was selected based on the vehicle speed V, however the linear portion for which the condition y2i>T is satisfied and having the minimum value of y2i may also be selected based on the throttle opening T.

As described hereintofore, the gear change controller for an automatic transmission in accord with this invention comprises a gear control means provided with a memory unit which first stores the coordinates (x1i, y1i) and (x2i, y2i) of the two ends of each of the linear portions forming kinked lines expressing "vehicle speed x/throttle opening y" characteristics, and with a gear change determining unit which first selects the linear portion for which the condition x2i>V or y2i>T is satisfied based on a vehicle speed V output by the vehicle speed sensor or a throttle opening T output by a throttle opening sensor and having the minimum value of X2i or y2i, and then determines that a shift to higher gear position should be made if the condition (T−y1i)(x2i−x1i)<(V−x1i)(y2i−y1i) occurs with respect to a kinked line for up-shifting, or that a shift to lower gear position should be made if the condition (T−y1i)(x2i−x1i)>(V−x1i)(y2i−y1i) occurs with respect to a kinked line for downshifting.

The advantages of the gear change controller according to the present invention are therefore that the determining of a shift to higher or lower gear position does not involve a division calculation, thus requiring a short processing time and small memory capacity, and that the slopes of the linear portions forming the kinked lines can be set with a high degree of freedom.

Moreover, in this gear change controller, when the line satisfying expression y2i=y1i has been selected, it is determined that a shift to higher gear position is necessary if the condition T<y1i occurs and that a shift to lower gear position is necessary if the condition T>y2i occurs. The determining process therefore does not require any computation to find products or differences, thus shortening the total processing time.

What is claimed is:

1. A gear change controller for an automatic transmission comprising:

a vehicle speed sensor and a throttle opening sensor;

gear control means for determining a gear position of the automatic transmission, based on inputs from said vehicle speed sensor and said throttle opening sensor and based on kinked lines expressing vehicle speed x vs throttle opening y characteristics, and generating a change-over signal according to the determined gear position; and a gear change-over actuator driven by said change-over signal from said gear control means;

wherein said gear control means includes:

a memory unit which stores coordinate data $(x1i, y1i)$ and $(x2i, y2i)$ $\{i=1, 2, 3, \ldots\}$ corresponding to two ends of each of a plurality of elemental linear portions of said kinked lines respectively expressing said vehicle speed x vs throttle opening y characteristics for shifting gear positions; and a determining unit which, based on a vehicle speed V detected by said vehicle speed sensor and a throttle opening T detected by said throttle opening sensor, first selects one of the linear portions for which one of the expression $x2i>V$ is satisfied and having a minimum value of $x2i$ and the expression $y2i>T$ is satisfied and having the minimum value of $y2i$, then determines a shift to higher gear position should be made when the condition $(T-y1i)(x2i-x1i)<(V-x1i)(y2i-y1i)$ occurs with respect to the kinked line for up-shifting, and determines a shift to lower gear position should be made when the condition $(T-y1i)(x2i-x1i)>(V-x1i)(y2i-y1i)$ occurs with respect to the kinked line for down-shifting.

2. A gear change controller for an automatic transmission as defined in claim 1, wherein when said gear change determining unit has selected a linear portion satisfying the expression $y2i=y1i$ on the kinked lines expressing vehicle speed x vs throttle opening y characteristics, said gear change determining unit then determines a shift to higher gear position should be made when the condition $T<y1i$ occurs with respect to the kinked line for up-shifting, and determines a shift to lower gear position should be made when the condition $T>y2i$ occurs with respect to the kinked line for down-shifting.

* * * * *